United States Patent Office 3,486,095
Patented Dec. 23, 1969

3,486,095
CYCLE CONTROL FOR LINEAR MOTION DEVICE
Donald G. Sherwood, Pittsburgh, Pa., and Irwin Rowe, Northridge, Calif., assignors to Westinghouse Electric Corporation, Pittsburgh, Pa., a corporation of Pennsylvania
Filed May 6, 1965, Ser. No. 453,691
Int. Cl. H02k 41/02
U.S. Cl. 318—135         5 Claims

ABSTRACT OF THE DISCLOSURE

In a linear motion device wherein a plurality of electromagnetic coils are used to move a plurality of pairs of magnetic pole pieces respectively into and out of engagement with one another in a predetermined sequence, a sensing means is provided adjacent each movable pole piece of each pair such that the engagement or separation of the pole pieces of each pair is detected by the sensing member. The sensing member is then utilized to energize or deenergize the succeeding coil in the sequence to continue the predetermined sequence.

---

Figure 1:
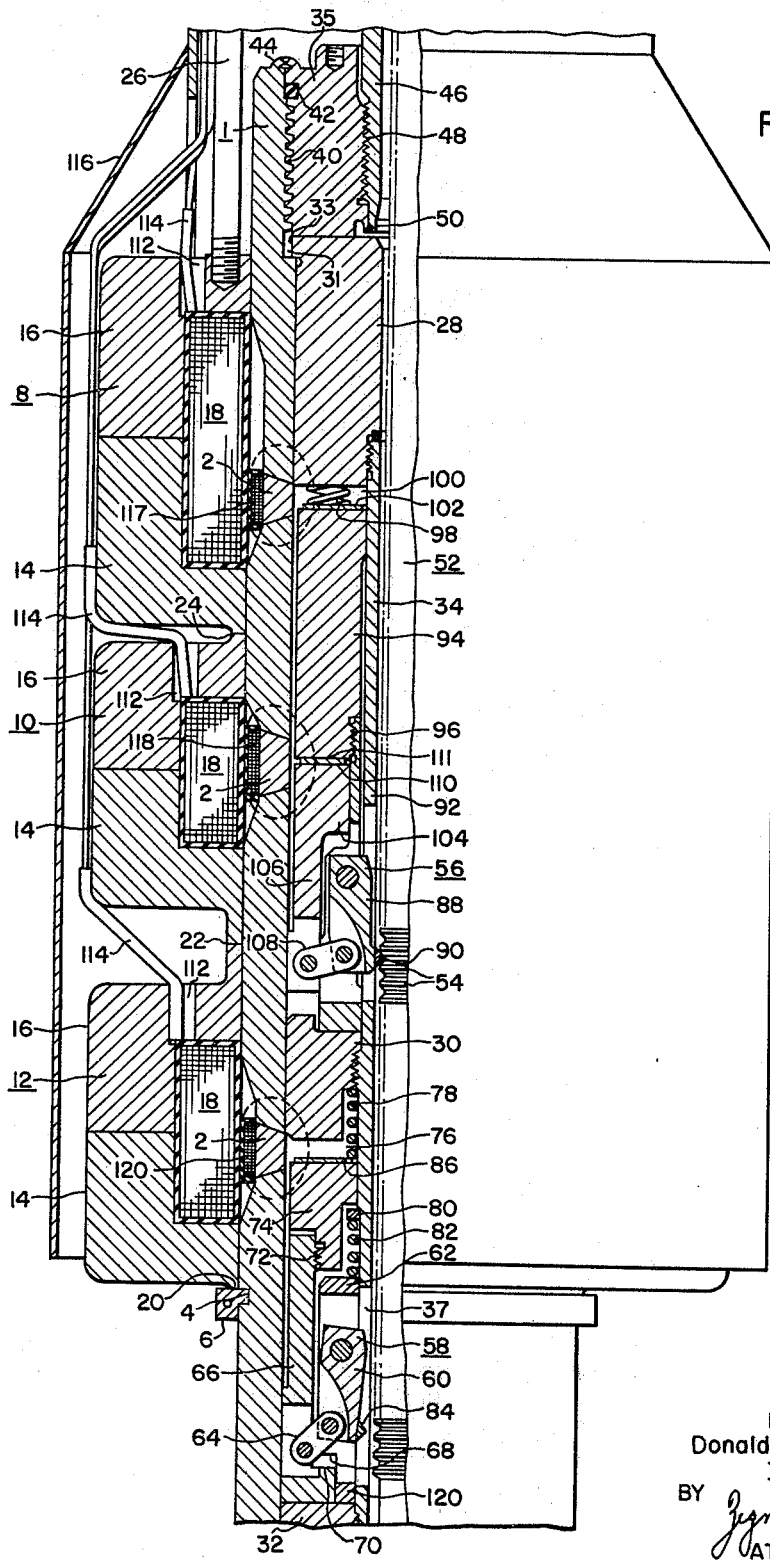

This invention relates to a linear motion device of the type adapted to move a linear element in incremental steps along a straight-line path of travel. More particularly, the invention relates to control apparatus for such linear motion devices.

There are many applications wherein it is desired to actuate a control element in a linear direction to a desired or predetermined position for the purpose of controlling various chemical processes or reactions, or for the purpose of actuating various elements of a complex mechanism. For example, in the production of nuclear energy in an atomic reactor, a number of control rods are moved within the reactor vessel in order to control the chain reaction developed in the core of the atomic reactor.

In certain types of linear motion devices, a plurality of electromagnetic coils are mounted in a manner to secure by magnetic attraction a linear element passing through the coils. One or more of the coils are utilized in combination with mechanical gripping devices to secure the element to a fixed element, while another coil or coils are employed to secure the element to a movable member. The movable member, in turn, is moved in either direction of a straight-line path of travel by additional or displacement coil means.

In general, there are two general types of linear motion devices. The first of these utilizes a grooved rod or linear element with magnetically actuated latches which provide for positive gripping of the rod while it advances through successive indexing steps. The second or friction type of linear motion device, on the other hand, relies on magnetic expansion of a flexible rod bundle against the bore of a movable plunger resulting in a friction grip of the rod bundle. In either case, the linear element is moved through successive indexing steps by magnetically attracting a movable member toward a stationary member followed by separation of the members. In this process the length of an air gap is varied between the members which comprise magnetically permeable elements of a magnetic circuit.

As will be understood, linear motion devices, regardless of the type, produce linear motion by repeating a switching sequence. That is, the motion of the linear element is produced by sequential energization of a plurality of electromagnetic coils or coil groups. In the past, this switching sequence has been achieved by a rotating cam shaft which actuates mechanical cam switches used to control energization of the coils. The moving parts in the cam assembly, however, are subject to wear and occasional malfunction and do not offer the long-term reliability required, for example, in nuclear power plant installations. In addition, the cam assembly will attempt to repeat the switching sequence even after failure of a coil or mechanical part. Further damage to the mechanism and a contribution of metal chips to the primary system, therefore, results.

As one object, the present invention provides a static cycle control for linear motion devices which replaces cam shafts and switches, thereby eliminating the problem of malfunctioning of the moving parts in a cam assembly.

A further object of this invention is to provide a sensing device for the coils of a linear motion device to determine if the coil is properly functioning.

Another object of the invention is to provide a static cycle control for a linear motion device which incorporates a self-operating safety switch feature which insures that upon failure of a coil or mechanical part, the switching sequence cannot be repeated so that further damage to the mechanism cannot result.

In accordance with the invention, the conventional rotating cam shaft and mechanical switches are replaced by electromagnetic sensing elements comprising coils which surround the mechanism magnet gaps where they sense mechanical movement inside the mechanism by a change in gap reluctance. The output of the sensing elements, in turn, provides power for switching of the electromagnetic coils which actuate the linear motion device.

Although, as mentioned above, the invention has application in any linear motion device, it is described herein in connection with a gripper-type linear motion device utilizing three solenoid coils to provide incremental linear motion for a linearly movable element. Two of the coils are formed to provide, when energized, latching for the two grippers of the linear motion device. A third coil is provided to achieve lifting or lowering, as the case may be, of the linearly movable element.

Figure 2:
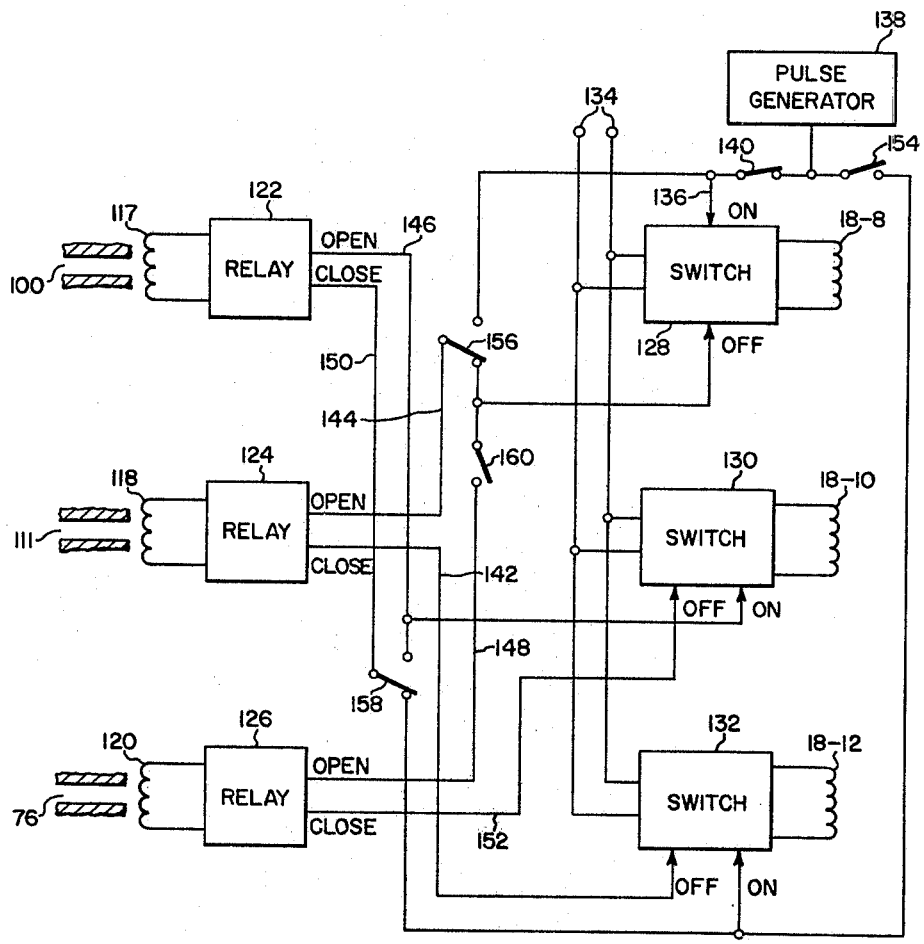

The above and other objects and features of the invention will become apparent from the following detailed description taken in connection with the accompanying drawings which form a part of this specification, and in which:

FIGURE 1 is a partially broken-away cross-sectional view of one type of linear motion device with which the present invention may be used; and FIG. 2 is a schematic circuit diagram of a control system for the linear motion device shown in FIG. 1 and incorporating the principles of the present invention.

For purposes of describing the illustrative example of a linear motion device with which this invention may be utilized, it will be noted that the gripper members of the linear motion device may be located in three relative positions with respect to the linear element which is moved thereby. One of the aforesaid relative positions will be defined as the "unlatched" position wherein the gripper is not in position for engagement with the teeth or other suitable catch means of the linearly movable element. For example, the lower gripper of FIG. 1 is located in the unlatched position.

A second relative position will be defined as the "latched" position wherein the gripper element is engaged with the linearly movable element and wherein the gripper is subjected to the load or weight of the linearly movable element. The upper gripper of FIG. 1 is illustrated in the latched position.

The third relative position of the components is defined as the "coupled" position wherein the gripper is located in its engaged position relative to the linearly movable element but the gripper is not subjected to the load created thereby. In other words, a clearance exists between the teeth of the linearly movable element and the outward tip of the gripper.

It will therefore be understood that a difference between the latched position and the coupled position of the gripper exists not with respect to the radial position of the gripper inasmuch as the radial position of the gripper would be the same, but by virtue of different axial position of the linearly movable element and gripper. In the latched position, the linearly movable element is in an axial position, wherein the gripper is subjected to the load thereof. For the coupled position, the linearly movable gripper is in an axial position wherein the gripper is not subjected to the load thereof.

Referring now to the drawings, and particularly to FIG. 1, the embodiment of the invention shown includes an outer pressure tubular housing 1, which is formed from magnetically permeable material and includes a plurality of circumferential weld inserts 2 of a non-magnetic material axially spaced therealong and positioned adjacent the solenoids of the linear motion device. The housing 1 is provided with a circumferential slot 4 which receives an annular stop 6 with the latter serving as the lower mount for the solenoids. Three solenoid coils are provided. The upper solenoid comprises a lift solenoid 8. The intermediate and lower solenoids 10 and 12 comprise upper and lower gripper operating solenoids, respectively. Each solenoid is provided with an annular bipartite housing with each housing part having a generally L-shaped cross section. The bipartite housing for each solenoid is formed from opposed L-shaped members 14 and 16 mounted in opposed relationship and forming an annular space therebetween in which there is disposed a solenoid coil 18–8. The lower solenoid housing part 14 for the lower gripper solenoid 12 is provided with a downwardly extending rim 20 disposed to engage the annular stop 6. The adjacent housing parts of adjacent solenoids are provided with circumferential extensions at 22 and 24 which abut and thereby position each of the solenoids 8, 10 and 12 relative to the housing 1 and opposite one of the nonmagnetic weld inserts 2, respectively.

Means for fixedly positioning the solenoid housing adjacent the ends of the solenoid 8 are provided. One such means may comprise tie rods 26 which may be suitably secured to a locking ring member (not shown) mounted adjacent the top of the linear motion device. An upper stop member 28, an intermediate stop member 30 and a lower stop member 32, each of annular configuration, are provided within the housing 1 and closely adjacent the inner surface thereof. The stop members are fixedly mounted in axially-spaced relationship by a tubular spacer 34 threadedly connected to each of the stop members 28, 30 and 32.

Only one tubular spacer 34 is utilized, with the assembly of stop members and tubular spacer being suspended from the upper end of the housing 1. In furtherance of this purpose, a circumferential recess 31 is provided in the inner surface of the housing 1 and the stop 28 is provided with an annular projection 33 disposed in the recess 31. A clamping means such as ring 35 is threadedly secured to the housing 1 at 40 by complementary threads formed on the inner surface of the housing 1 and on the outer surface of the clamping ring 35. Means for sealing the housing between the clamping ring 35 and housing 1 may be provided. One example of a suitable sealing means comprises an O-ring 42 disposed in complementary recesses formed in the housing 1 and the clamping ring 35. A seal weld such as a canopy ring 44 may also be provided on the adjacent surfaces of the housing 1 and the clamping ring 35. One example of a suitable seal means 44 is shown and described in detail in Patent 2,805,789, issued to Kreh et al. and assigned to Westinghouse Electric Corporation. The lower surface of the clamping ring 35 engages the upper stop 28 to force the projection 33 into engagement with the lower wall of the recess 31.

An upper housing 46, only part of which is shown in FIG. 1, is threadedly secured to the inner circumference of the locking ring 35 at 48. This housing 46 desirably encloses the interior of the linear motion device to permit the latter to be subjected to substantial internal pressures. Accordingly, a suitable closing means is provided at the upper surface (not shown) of the upper housing 46. To insure the integrity of the housing at the position of engagement of the housing 46 and the locking ring 35, a circumferential seal weld desirably is provided at 50 to seal hermetically the interior of the linear motion device.

A drive rod or lead screw 52 comprising a linear element is provided and includes a plurality of axially spaced teeth 54 which extend circumferentially about the outer surface of the drive rod 52. A pair of gripper assemblies are provided to engage the lead screw 52 and to provide incremental linear movement thereof in opposite directions. The upper gripper assembly is denoted by reference character 56 and the lower gripper assembly is denoted by reference character 58. Each of the gripper assemblies includes a plurality of pivotally movable gripper arms circumferentially spaced around the drive rod 52. The lower gripper assembly is provided with at least one gripper arm 60 which is pivotally secured to a support annulus 62. A link member 64 is pivotally secured to the gripper arm 60 and to a support tube 66. The support tube 66 extends downwardly to a position of engagement with the lower stop 32. The support annulus 62 desirably is provided with a downwardly facing shoulder 68 which is disposed to be engaged by a circumferential flange 70 formed on the lower end of the support tube 66. The flange 70 is spaced from the shoulder 68 when the solenoid 12 is deenergized. The support tube 66 is secured by suitable means such as by threading at 72 to a gripper operating pole 74. The gripper operating pole 74 and the intermediate stop 30 comprise the poles for the solenoid 12. The pole 74 is movable, upon energization of the solenoid 12 toward the lower surface of the stop 30 to close the air gap 76 therebetween. Biasing means such as a spring 78 is disposed in compression between the stop 30 and the upper surface of the pole 74. Load transfer means are coupled to the lower gripper assembly 58 and comprises a stop 80 secured against a shoulder formed on the outer surface of the spacer tube 34 together with a biasing means such as a coil spring 82 which is compressed between the stop 80 and the upper surface of the gripper support tube 62. Upon energization of the solenoid 12, the gripper support tube 62 does not move upwardly against the force of the spring 82 until the flange 70 engages the shoulder 68.

Energization of the lower gripping operating solenoid 12 creates a magnetic flux through the air gap 76 which tends to close the latter. The pole 74 moves upwardly toward the fixed stop 30 against the force of the coil spring 78.

During the upward movement of the pole piece 74 to close the air gap 76, the support annulus 62 remains stationary and the gripper arm 60 is swung inwardly through an opening 37 in the spacer tube 34 until the tip 84 thereof is in the coupled position. At that point, the flange 70 engages the shoulder 68 and the pole 74 carries the support annulus 62, the gripper assembly 58 and the drive rod 52 upwardly for a distance sufficient to move the lower gripper assembly 60 to the latched position and to place the upper gripper assembly 56 in the coupled position. A suitable non-magnetic washer 86 is mounted on the upper surface of the pole 74 for the purpose of insuring rapid decay of flux when the solenoid 12 is being deenergized.

The upper gripper assembly 56 is provided with a plurality of pivotally movable gripper arms 88 having wear resistant inwardly extending tips or projections 90 thereon, with the latter projections being disposed to engage the teeth 54 of the drive rod 52. The upper gripper assembly support tube 92 is connected to the movable pole piece 94, such as by threads 96. The upper pole piece 94 forms a movable pole of the lift solenoid 8. The other pole of the lift solenoid 8 comprises the upper stop 28. Resilient means such as coil spring 98 desirably is disposed in the gap 100 of the lift solenoid 8. The resilient means or spring 98 has one end thereof engaging a non-magnetic washer 102 placed on the upper surface of the pole 94 and has its other end (not shown) disposed in a recess (not shown) formed in the lower surface of the upper stop 28. In this manner, when the gap 100 is closed by energizing the solenoid 8, the spring is compressed and recedes entirely into the last-mentioned recess. Movement of the pole 94 to close the gap 100 results in upward movement of the support tube 92 together with the upper gripper assembly 56. In the event the arms 88 of the upper gripper assembly 56 are in the latched position relative to the drive rod 52, the upward movement of the pole 94 results in the lifting of the lead screw 52. Pivotal movement of the upper gripper assembly 56 into and out of engagement with the drive rod 52 is accomplished by the energization or deenergization of the upper gripper solenoid 10. The upper gripper solenoid 10 includes as a pole thereon the pole 94 together with a gripper operating pole 104. The gripper operating pole 104 includes a downwardly extending projection 106 which pivotally supports one end of a link member 108. The link member 108 is pivotally mounted at its other end on the lower end of the gripper arm 88. A non-magnetic washer 110 is supported on the gripper operating pole 104 in the gap 111, shown closed, between pole 104 and pole piece 94. The upper gripper operating solenoid 10 is illustrated in FIG. 1 as energized, so that the air gap between the poles 94 and 104 thereof is completely closed. Deenergization of the solenoid 10 would result in a downward movement of the pole 104 relative to the upper pole 94 and would cause pivotal movement of the gripper arm 88 about the link member 108 out of engagement with the teeth 54 of the drive rod 52, thereby moving the arm 88 to the unlatched position.

Each of the magnetic annuli 16 of the solenoids 8, 10 and 12 desirably is provided with an opneing 112 therein which permits the passage of suitable conductors 114 therethrough for the purpose of energizing the coils of the solenoids 8, 10 and 12, respectively. An outer cover 116 of generally annular configuration may be mounted to enclose the outer periphery of the solenoids 8, 10 and 12 for the purpose of preventing possible damage to the conductors 14.

It is to be noted, of course, that the air gaps for each of the solenoids desirably are disposed in positions juxtaposed to the non-magnetic inserts 2 of the housing 1. It is to be further noted that the lower gripper assembly provides the load transfer function of the linear motion device with the lifting and lowering functions thereof being performed by the upper gripper assembly 56.

Operation of the linear motion device illustrated in FIG. 1 is achieved by sequentially energizing and deenergizing the solenoids 8, 10 and 12 in a predetermined manner. For example, if incremental upward movement of the drive rod 52 is desired, and if the linear motion device is in the position illustrated in FIG. 1, the last-mentioned incremental motion will be achieved in the following manner.

In FIG. 1 the upper gripper assembly 56 is illustrated in the latched position and the lower gripper assembly 58 is illustrated in the unlatched position. The solenoid 8 is illustrated as deenergized, the solenoid 10 is illustrated as energized and the solenoid 12 is illustrated in a deenergized state. Incremental upward movement is begun by energizing the lift solenoid 8 to close the gap 100. The upper gripper assembly together with the drive rod 52 is moved incrementally upwardly for a distance equal to the pitch between adjacent teeth 54 thereof. Next, the lower gripper operating solenoid 12 is energized moving the lower gripper assembly 58 from the unlatched position through the coupled position and to the latched position as hereinbefore described. This movement of the lower gripper assembly 58 transfers the load or weight of the drive rod 52 entirely to the lower gripper arm 60 so that the upper gripper arm 88 is now in the coupled position. The upper gripper operating solenoid 10 is deenergized resulting in downward movement of the pole 104 and pivotal outward movement of the upper gripper arm 88 from the coupled position to the unlatched position. The lift solenoid 8 is then deenergized to open the gap 100 under the force of the spring 98. This last-mentioned movement includes downward movement of the pole 104 for a distance equal to the length of the gap 100 retaining the gripper arm 88 in the unlatched position. The upper gripper operating solenoid 10 then is energized to move the upper gripper arm inwardly toward the lead screw from the unlatched position to the coupled position. Finally, the lower gripper operating solenoid 12 is deenergized first causing the lower gripper arm 60 to move downwardly under the force of the spring 82 until the weight of the drive rod 52 rests entirely upon the upper gripper arm 88, placing the latter in the latched position and until a clearance exists between the tip 84 of the gripper arm 60 and the adjacent teeth 54 of the lead screw so that the arm 60 is in the coupled position. Downward movement of the support tube 62 and the gripper arms 60 is now prevented by the engagement of the lower end 120 of the support tube 62 with the upper surface of the lower stop 32. Downward movement of the pole 74, however, continues causing the gripper arm 60 to move outwardly from the drive rod 52 to the unlatched position. At this stage the linear motion device is now in its initial condition and further upward incremental movement is achieved by repeating the last-described cycle.

Downward incremental movement of the FIG. 1 embodiment of this invention is achieved by sequentially energizing and deenergizing the solenoids 8, 10 and 12 in a predetermined manner. The sequence of operation, with the linear motion device being in the state shown in FIG. 1 is as follows:

First, the lower gripper operating solenoid 12 is energized moving the lower gripper arm 60 from the unlatched position through the coupled position and to the latched position, the beforementioned movement also resulting in the placing of the upper gripper arms 88 from the latched position to the coupled position. Next, the upper gripper operating solenoid 10 is deenergized moving the upper gripper arm 88 from the coupled position to the unlatched position. The lift solenoid 8 is energized close the gap 100 thereby moving the upper gripper arm 88, while retaining the same in the unlatched position, an upward increment equal to the pitch between the teeth 54 of the drive rod 52. The upper gripper operating solenoid 10 now is energized moving the pole 104 into engagement with the pole 94, the last-mentioned movement resulting in the placing of the upper gripper arm 88 in the coupled position. The lower gripper operating solenoid 12 now is deenergized. As a result the lower gripper arm 60 is moved from the latched position to the coupled position, placing the upper gripper arm 88 in the latched position, and then the lower gripper arm 60 also moves from the coupled position to the unlatched position. The lift solenoid 8 now is deenergized moving the upper gripper arms 88 downwardly a distance equal to one thread pitch under the force of the spring 98 and the weight of the lead screw 52. Further downward incremental movement of the drive rod 52 is achieved by repeating the above-described cycle.

It is to be noted that resilient means (not shown) may be disposed between the poles 94 and 104 in order to insure separating the poles upon deenergization of the upper gripper operating solenoid 10.

The lift and pull-down cycles of the device shown in FIG. 1 may, therefore, be summarized as follows:

I—LIFT CYCLE (1) At start of cycle, coil 18–10 is energized while coils 18–8 and 18–12 are deenegrized.
(2) Lift coil 18–8 is energized, closing gap 100.
(3) Coil 18–12 is energized, closing gap 76.
(4) Coil 18–10 is deenergized, opening gap 111.
(5) Coil 18–8 is deenergized, opening gap 100.
(6) Coil 18–10 is energized, again closing gap 111.
(7) Coil 18–12 is deenergized, opening gap 76.
(8) Cycle repeats.

II—DOWNWARD CYCLE (1) At start of cycle, coil 18–10 is energized while coils 18–8 and 18–12 are deenergized, same as at start of lift cycle.
(2) Coil 18–12 is energized, closing gap 76.
(3) Coil 18–10 is deenergized, opening gap 111.
(4) Lift coil 18–8 is energized, closing gap 100.
(5) Coil 18–10 is energized, closing gap 111.
(6) Coil 18–12 is deenergized, opening gap 76.
(7) Coil 18–8 is deenergized, opening gap 100.
(8) Cycle repeats.

As was mentioned above, the cycle of operation for either upward or downward moton in a linear motion device of the type shown in FIG. 1 was previously controlled by a rotating cam shaft which actuated mechanical cam switches to effect the proper sequential energization of the solenoids 8, 10 and 12. However, this involved maintenance problems and affected the long-term reliability of the device. It will be noted from the foregoing summary of the lift and downward cycles that each step in the cycle, whether upward or downward, involves an opening or closing of one of the gaps 100, 111 or 76. This factor is utilized in accordance with the present invention in providing a static cycle control which eliminates the need for cam shafts and switches.

Specifically, and in accordance with the present invention, sensing elements are provided around each of the weld inserts 2 adjacent the gaps 100, 111 and 76. These sensing elements comprise electromagnetic coils 117, 118 and 120 for the gaps 100, 111 and 76, respectively. Assuming that the coils 117, 118 and 120 are permanently energized to produce the lines of flux shown, it will be appreciated that when any of the gaps is changed from an open position to a closed position, or vice versa, a change in reluctance is presented to the lines of flux. This change in reluctance, in turn, effects a change in the impedance presented by the coils 117, 118 and 120. The coils 117, 118 and 120, consequently, act as proximity sensing devices to determine whether the solenoid coils 18–8, 18–10 and 18–12 are operating properly. In addition, the sensing coils 117, 118 and 120 may be used with external circuitry, hereinafter described, to control the upward or downward cycle of motion of the linear motion device.

With reference now to FIG. 2, one exemplary type of control circuit which may be utilized in combination with the coils 117, 118 and 120 to control the linear motion device is shown, it being understood that other and different types of control circuits may be utilized in accordance with the invention. The coils 117, 118 and 120 are connected to relays 122, 124 and 126 respectively. As will be understood by those skilled in the art, the relays 122–126 may take various forms, their essential function being to sense a change in reluctance presented to the magnetic lines of flux produced by the coils 116–120. In this respect, each of the relays 122–126 will include a source of energizing current for the coils 117–120 together with means for sensing a change in impedance presented by its associated coil due to a change in reluctance of the gap. Each of the relays has two output leads, one of which is labeled "close" and the other of which is labeled "open." Each relay is such that when its associated gap closes, a pulse will appear on its "close" output lead; whereas a pulse will appear on its "open" output lead when the gap opens.

The relays 122–126 serve to control switches 128, 130 and 132 which, in turn, serve to connect or disconnect the coils 18–8, 18–10 and 18–12 to a source of electrical potential applied to the input terminals 134. Each switch 128–132 is such that when a pulse is applied to one of its input leads, it will remain in either its open or closed position, as the case may be, until an actuating pulse is applied to the other of its input leads.

During upward travel of rod 52 the switches 140, 154, 156, 158 and 160 of FIG. 2 are all in the positions shown. In order to initiate an upward cycle of operation, a pulse is applied to switch 128 on lead 136 to close it momentarily, thereby energizing the coil 18–8. The pulse on lead 136 is supplied from a source of pulses schematically illustrated at 138 in FIG. 2. These pulses are applied to lead 136 by switch 140 which is now closed. If, for example, it is desired to advance the rod 52 upwardly through incremental steps at the rate of thirty steps per minute, the frequency of the pulses supplied by circuit 138 will be thirty per minute. Thus, when the switch 140 is closed, the rod 52 will continue to advance upwardly at the rate of thirty incremental steps per minute until it is again opened, at which point the rod will stop with coil 18–10 energized and coils 18–8 and 18–12 deenergized.

At the start of the cycle, coil 18–10 is energized while coils 18–8 and 18–12 are deenergized (refer to "LIFT CYCLE" described above). When switch 140 is closed, the first pulse on lead 136 closes switch 128, thereby energizing coil 18–8 and closing gap 100. When gap 100 closes, coil 117 actuates relay 122 whereby a pulse appears on the "close" lead 150 to close switch 132, thereby energizing the coil 18–12. When coil 18–12 is energized, the gap 76 closes, thereby actuating relay 126 to produce a pulse on the "close" lead 152. The pulse on lead 152 in turn, opens switch 130 to deenergize coil 18–10, thereby opening the gap 111. Upon opening of gap 111, the relay 124 is actuated to produce a pulse on lead 144, whereupon switch 128 is opened to deenergize coil 18–8. This action opens the gap 100 to actuate relay 122 which produces a pulse on lead 146, whereupon switch 130 closes to energize coil 18–10. Upon energization of coil 18–10, gap 111 closes and relay 124 is actuated to again energize lead 142, whereupon switch 132 is opened to deenergize coil 18–12.

From the foregoing, it will be appreciated that the coils 117–120 control the "LIFT CYCLE" sequence of operations described above. This cycle is repeated at the rate of thiry times per minute, assuming that the pulse rate of pulses from source 138 is thirty per minute.

To lower the rod 52, the switches 140, 154, 156, 158 and 160 are reversed from the positions shown in FIG. 2. When switch 154 closes, it applies a pulse to switch 132. This energizes coil 18–12 to close gap 76. When gap 76 closes, a pulse appears on lead 152 to open switch 130 and deenergize coil 18–12, thereby opening gap 111. When gap 111 opens, a pulse is produced on lead 144. This pulse is applied through switch 156, which is now reversed with respect to its position shown in FIG. 2, to lead 136 to close switch 128 and energize coil 18–8. Energization of coil 18–8 closes gap 100 to produce a pulse on lead 150 which is now applied through switch 158 to close switch 130, thereby energizing coil 18–10. When coil 18–10 is energized and gap 111 closes, a pulse is produced on lead 142 by relay 124 to open switch 132, thereby deenergizing coil 18–12 and opening gap 76. When gap 76 opens, a pulse is produced on lead 148 which is applied through switch 160, which is now closed, to switch 128. This opens switch 128 to complete the "DOWNWARD CYCLE" described above. Subsequent pulses from circuit 138 repeat the cycle at the rate of thirty times per minute for the example given.

In either case, whether the movement of rod 52 is upward or downward, failure of any gap to open or close at the proper time due to a breakdown of its associated coil or parts will stop the cycle. As was mentioned above, this is an important feature of the invention in that it prevents further damage to the mechanism and prevents a contribution of metal chips to the primary system in the case where the device is used on a nuclear reactor.

Although the invention has been shown in connection with a certain specific embodiment, it will be readily apparent to those skilled in the art that various changes in form and arrangement of parts can be made to suit requirements without departing from the spirit and scope of the invention. In this respect, it is again emphasized that the linear motion device of FIG. 1 is exemplary of only one type of mechanism of this sort with which the invention may be used and that the control circuit of FIG. 2 is purely schematic and for purposes of illustration only.

We claim as our invention:

1. In a linear motion device of the type which includes a linear element, a stationary member of magnetically permeable material surrounding the linear element, a movable member of magnetically permeable material surrounding the linear element and movable along the axis of the linear element into and out of engagement with the stationary member, means for operatively connecting the movable member to the linear element, and actuating electromagnetic coil means for attracting the movable member to the stationary member; the combination of means for controlling energization of said actuating coil means including second electromagnetic coil means adapted to produce lines of flux which pass through the gap between said members when they are separated, and circuit means responsive to a change in reluctance presented to the lines of flux produced by the second coil means when the movable member moves into and out of engagement with the stationary member for controlling energization of the actuating coil means.

2. In a linear motion device of the type which includes a linear element, a stationary member of magnetically permeable material surrounding the linear element, a movable member of magnetically permeable material surrounding the linear element and movable along the axis of the linear element into and out of engagement with the stationary member, means for operatively connecting the movable member to the linear element, and actuating electromagnetic coil means surrounding the gap between said members when they are separated for attracting the movable member to the stationary member; the combination of means for controlling energization of said actuating coil means including second electromagnetic coil means of diameter smaller than said actuating coil means and coaxial therewith, said second coil means being positioned to surround said gap and being adapted to produce lines of flux which pass through the gap between said members when they are separated, and circuit means responsive to a change in reluctance presented to the lines of flux produced by the second coil means when the movable member moves into and out of engagement with the stationary member for controlling energization of the actuating coil means.

3. In a linear motion device of the type which includes a linear element, a plurality of stationary members of magnetically permable material surrounding the linear element, at least one movable member of magnetically permeable material surrounding the linear element and movable along the axis of the linear element into and out of engagement with the stationary members, means for operatively connecting the movable member to the linear element, and a plurality of actuating electromagnetic coils for attracting the movable member to the stationary members; the combination of means for controlling energization of said actuating coils including a plurality of second electromagnetic coils each adapted to produce lines of flux which pass through a gap between said movable member and an associated stationary member when the two are separated, and circuit means responsive to a change in reluctance presented to the lines of flux produced by the second coils when the movable member moves into and out of engagement with the stationary members for controlling energization of the actuating coils.

4. In a linear motion device of the type in which relative motion is produced between magnetically permeable members to vary the gap therebetween and wherein the magnetically permeable members are generally cylindrical in configuration and surround a linearly movable element, the combination of actuating electromagnetic coil means coaxial with said linear element and surrounding said magnetically permeable members to produce lines of flux which bridge the gap between said members when they are separated, second electromagnetic coil means coaxial with said linear element and carried on the inner periphery of said actuating coil means, said second electromagnetic coil means being positioned to produce lines of flux which also pass through the gap between said members when separated, and circuit means responsive to a change in reluctance presented to the lines of flux produced by said second electromagnetic coil means when the gap between said members is varied for controlling energization of said actuating electromagnetic coil means.

5. In a linear motion device of the type in which relative motion is produced between magnetically permeable members to vary the gap therebetween and wherein the magnetically permeable members are generally cylindrical in configuration and surround a linearly movable element, the combination of actuating electromagnetic coil means coaxial with said linear element and surrounding said magnetically permeable members to produce lines of flux which bridge the gap between said members when they are separated, second electromagnetic coil means coaxial with said linear element and carried on the inner periphery of said actuating coil means, and said second electromagnetic coil means being positioned to produce lines of flux which also pass through the gap between said members when separated.

References Cited

UNITED STATES PATENTS

| | | | |
|---|---|---|---|
| 1,966,235 | 7/1934 | Dawson | 318—127 |
| 2,365,632 | 12/1944 | Fisher | 310—14 |
| 3,158,766 | 11/1964 | Frisch | 310—14 |
| 3,225,228 | 12/1965 | Roshala | 310—12 |

MILTON O. HIRSHFIELD, Primary Examiner

D. F. DUGGAN, Assistant Examiner

U.S. Cl. X.R.

310—14